United States Patent
Li

(10) Patent No.: US 6,442,007 B1
(45) Date of Patent: Aug. 27, 2002

(54) GROUND FAULT INTERRUPTER WITH DISPLAY CIRCUIT

(75) Inventor: Chengli Li, Chongqing (CH)

(73) Assignee: Wenzhou Van-Sheen Electric Appliance Co., Ltd., Leqing (CN)

( * ) Notice: Subject to any disclaimer, the term of this patent is extended or adjusted under 35 U.S.C. 154(b) by 0 days.

(21) Appl. No.: 09/502,011

(22) Filed: Feb. 11, 2000

(30) Foreign Application Priority Data

Dec. 28, 1999 (CH) .................................... 992575247 U

(51) Int. Cl.[7] ................................................ H02H 9/08
(52) U.S. Cl. ..................................................... 361/42
(58) Field of Search ............................. 361/42, 46, 49

(56) References Cited

U.S. PATENT DOCUMENTS

| | | | | |
|---|---|---|---|---|
| 5,418,678 A | * | 5/1995 | McDonald | 361/46 |
| 5,642,248 A | * | 6/1997 | Campolo et al. | 361/42 |
| 5,757,598 A | * | 5/1998 | Aromin | 361/49 |
| 6,052,266 A | * | 4/2000 | Aromin | 361/49 |
| 6,018,237 A | * | 6/2000 | Havel | 324/115 |

* cited by examiner

*Primary Examiner*—Edward H. Tso
*Assistant Examiner*—Pia Tibbits
(74) *Attorney, Agent, or Firm*—Birch, Stewart, Kolasch & Birch, LLP

(57) ABSTRACT

The present invention is a simple, low cost, and easy-to-operate ground fault circuit interrupter (GFCI) device equipped with a display circuit for displaying whether the power-input terminals are correctly connected. The device consists of a cover plate and a main body, which includes power-input terminals, plug-in sockets, power-output terminals, a reset button, a simulated earth leakage test button, a current monitoring circuit, and a display circuit. The display circuit is comprised of a commutation diode, a current-limiting resistor, and a variable-color display lamp. Two control legs of the variable-color display lamp are connected with a power-input terminal and a power-output terminal, respectively. One of the control legs and the common leg of the variable-color display lamp are connected in series with a current limiting resistor and commutation diode to form a loop, and are connected in parallel to one side of the power-input terminals.

5 Claims, 3 Drawing Sheets

GROUND FAULT INTERRUPTER WITH DISPLAY CIRCUIT

FIELD OF THE INVENTION

The present invention relates to a ground fault circuit interrupter (GFCI) device. More particularly, the invention relates to a ground fault circuit interrupter device that can directly indicate and display the working conditions of the interrupter to indicate whether the power-input terminal connections are correct.

BACKGROUND OF PRIOR ART

In general, conventional GFCI devices only display whether the plug-in socket is connected with a power source. Generally, these devices have no means to show the user whether the internal of socket is connected correctly. Furthermore, the socket has only one output means—the plug-in socket; hence the application scope of conventional GFCI devices is narrow.

There are other GFCIs on the market, as shown in FIG. 1. They typically include a cover plate 1 and main body 2 with power-input terminals 5A and 5B, output terminals 5C and 5D (terminals 5B and 5C are at the symmetrical position of 5A and 5D, located on the other side of main body 2, not shown in FIG. 1), and one or more plug-in output sockets 3. Internal to the main body of conventional GFCIs is a current monitoring circuit, set such that when the current difference between the hot and the neutral lines is larger than the pre-determined value, the GFCI will automatically cut off power output. The GFCI is also equipped with a simulated earth leakage test button (TEST) 6 and reset button (RESET) 7. When RESET 7 is pressed on, output socket 3 and output terminals 5C and 5D receive electricity; when TEST 6 is pressed on, the output terminals are off.

The main drawback of these conventional GFCIs is the lack of a means to clearly indicate whether the power output terminals are charged. As the GFCI devices of this type typically have a pair of naked output terminals 5C and 5D, a careless user has the danger of being shocked, perhaps causing injury or death.

SUMMARY OF THE INVENTION

The general object of the present invention is to overcome the aforementioned drawbacks of GFCIs in prior art by providing a means to indicate the working conditions of the interrupter, and thus, whether or not its power-input terminals are connected correctly.

A second object of the present invention is simplicity and reliability of design and operations, enabling low cost manufacture and convenience of use.

To achieve these objectives, the present invention adopts the following design plan. The present invention comprises a cover plate and a main body, including two power-input terminals, one or more plug-in sockets, two power-output terminals, a reset button and a simulated earth leakage test button, an internal current monitoring circuit and internal display circuit. The display circuit is comprised of a variable-color display lamp (LED), a current limiting resistor, and a commutation diode. The variable-color display lamp has a two-color display lamp with three legs—one common leg, and two control legs. The two control legs of the variable-color display lamp are connected with a power-input terminal and a power-output terminal respectively. One of the control terminals and the common terminal of the variable-color display lamp (LED) are connected in series with a current-limiting resistor and a commutation diode to form a loop, and connected in parallel to one side of the power input terminals.

The variable-color display lamp in the display circuit of the present invention may be a common anode or a common cathode variable-color display lamp.

DETAILED DESCRIPTION OF THE INVENTION

Figure 1:
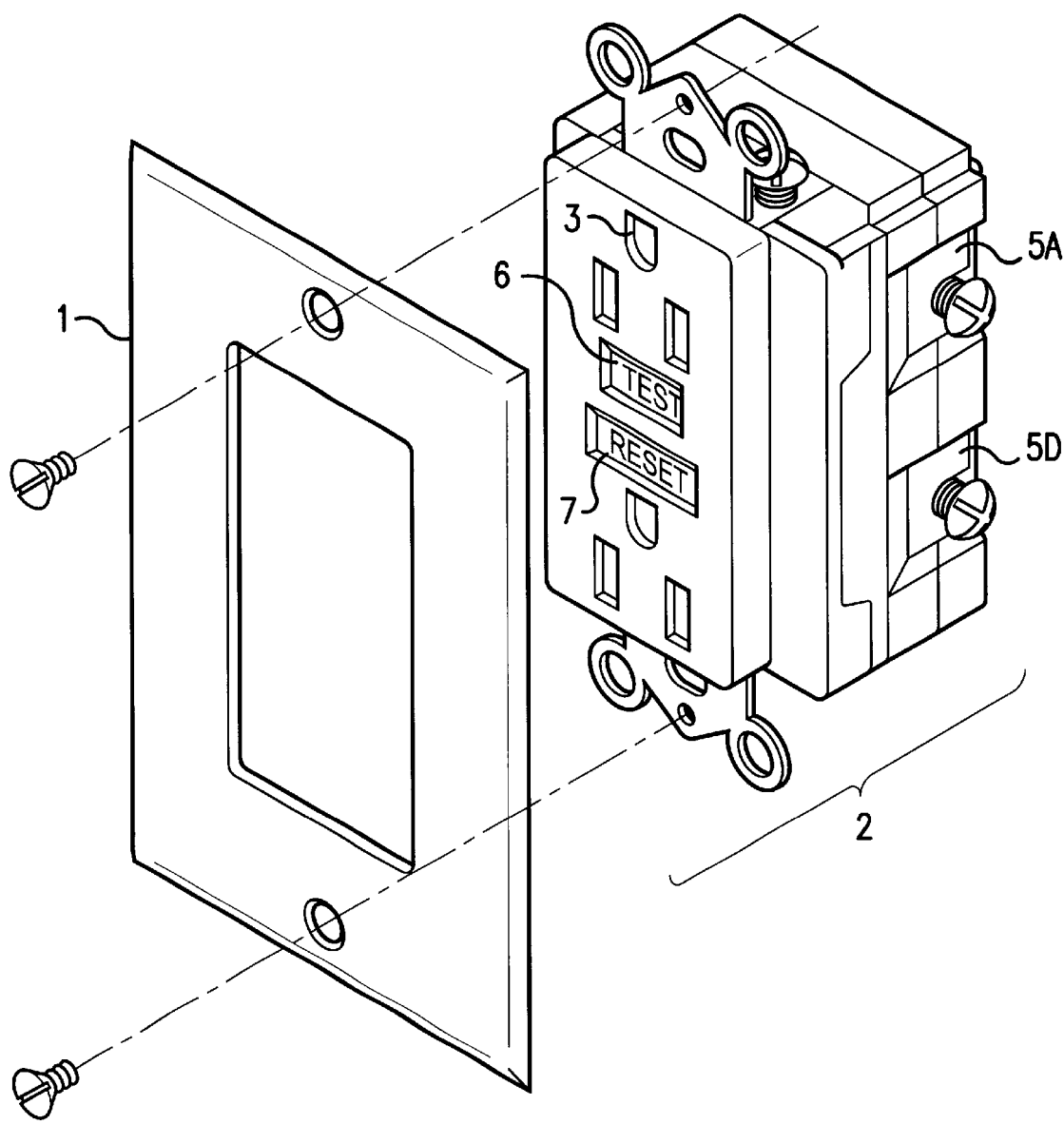
FIG. 1 is the diagram of the existing ground fault circuit interrupter (GFCI)
Figure 2:
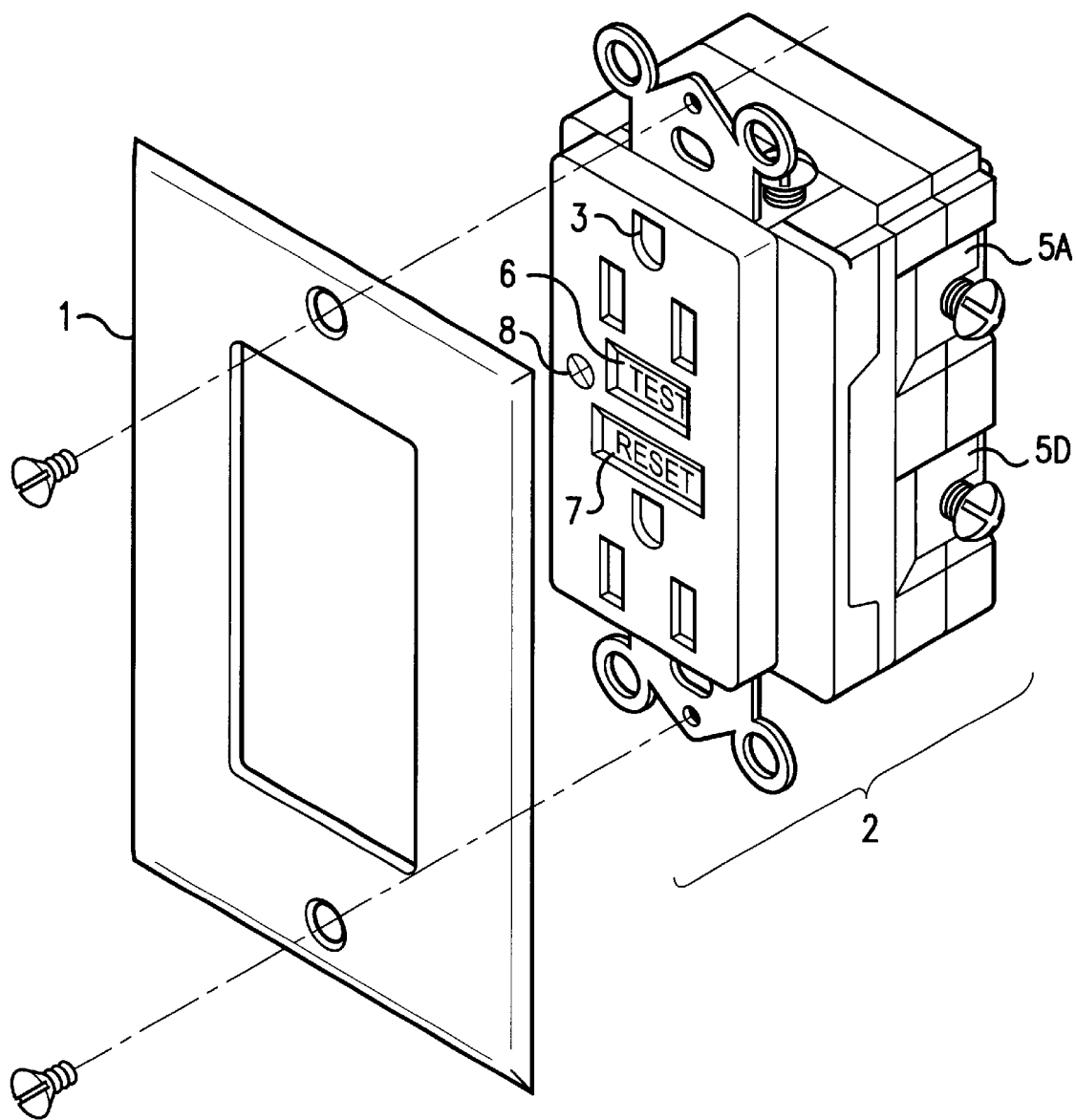
FIG. 2 is the diagram of the improved GFCI of the present invention.

As shown in FIG. 2, the present invention consists of cover plate 1 and main body 2. Main body 2 is fitted with power-input terminals 5A and 5B, plug-in sockets 3, power-output terminals 5C and 5D, press-in earth leakage test button (TEST) 6, reset button (RESET) 7 and variable-color display lamp (LED) 8.

Plug-in sockets 3, TEST button 6, RESET button 7, and the display lamp (LED) 8 are all located on the front side of the main body 2, and thus are visible even when cover plate 1 is installed. A power monitoring circuit and a display circuit are situated inside the main body.

When the current difference between hot line L and neutral line N is larger than the pre-determined value, the power monitoring circuit works, cutting off output of the interrupter, and permitting no voltage output from power output terminals 5C and 5D and plug-in socket 3, thus achieving the goal of protecting the electrical appliance. As this power monitoring circuit is the existing technology, it is not expounded upon here.

Figure 3:
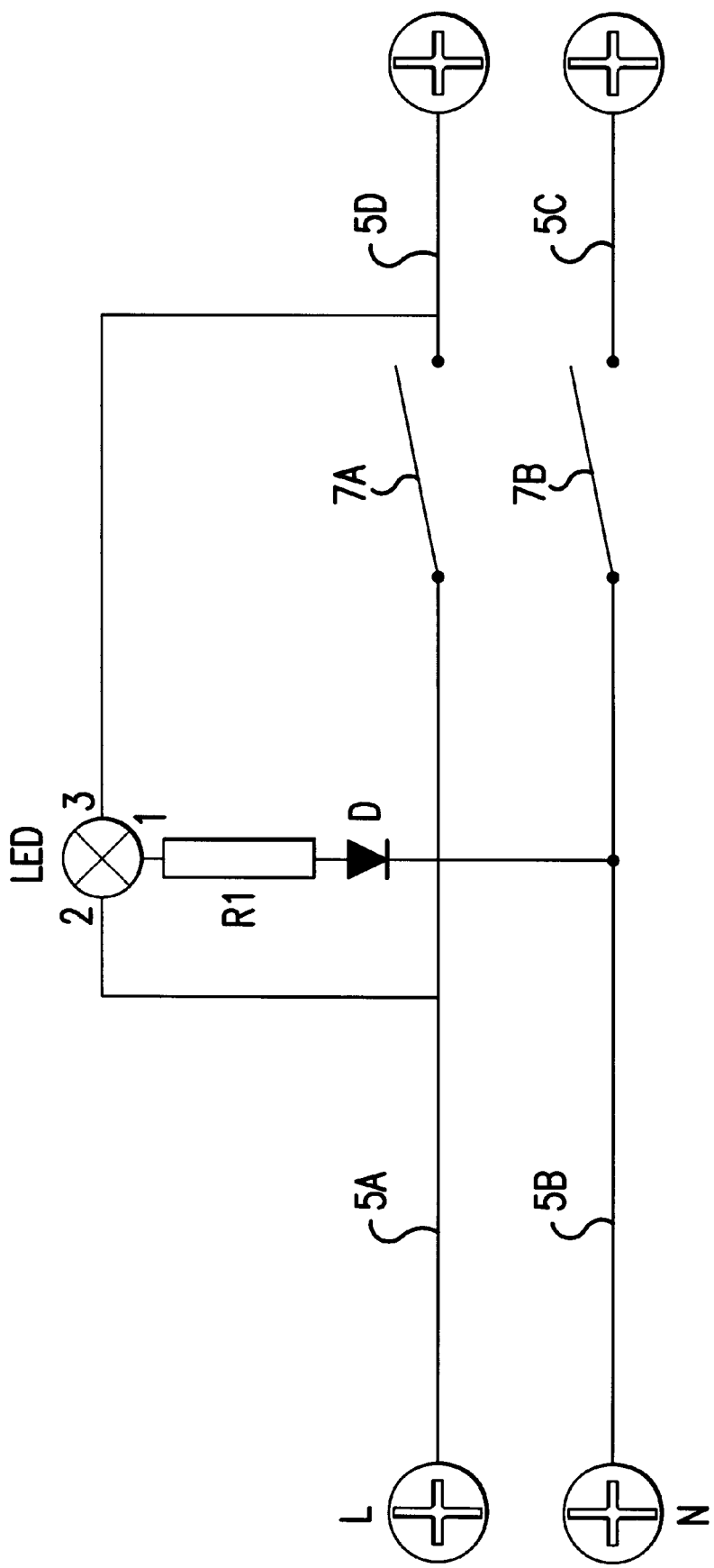
FIG. 3 is a display circuit diagram of an improved GFCI as described in one embodiment.

FIG. 3 is a diagram of the display circuit features comprising the present invention. As shown in the diagram, the display circuit is comprised of a variable-color display lamp LED, current-limiting resistor R1, and commutation diode D. The variable-color display lamp is a two-color display lamp, in which legs 2 and 3 are connected with power-input terminal hot line L and power-output terminal 5D respectively. The LED common leg 1 and control leg 2 form a loop along with R1 and D, shunted to one side of the main return power input terminal.

When hot line L and neutral line N are correctly connected with power-input terminals of the GFCI, in other words, 5A and hot line L, and 5B and neutral line N are connected, the display lamp LED control leg 2 and common leg 1 receive electricity, and the display lamp turns red. When hot line L and neutral line N are not connected with the power input terminals 5A and 5B, but instead are connected with power output terminals 5C and 5D, the LED is not on, and emits no light. Thus, a red LED indicates that the power-input terminal connections are correct; and a LED emitting no light indicates that the power-input terminal connections are wrong.

Again, when power-input terminal connections of the GFCI are correct, the LED is red. When the LED shows a red color, pressing RESET 7 causes 7A and 7B to close, and brings electric current to output terminals 5C and 5D and output socket 3, and simultaneously brings electric current to all three legs of the LED, whereupon the LED turns from red to green. Then, if the simulated earth leakage test button (TEST) 6 is pressed, switches 7A and 7B cut off, LED control leg 3 loses electricity, which causes the LED to turn from green to red, the result of output terminals 5C and 5D and plug-in output socket 3 not carrying electricity.

Therefore, a green LED indicates that power-output terminals of the GFCI device are carrying electricity, and user must be careful to prevent electric shock. A red LED indicates the input terminal connections of the GFCI device are correct, the power source is connected, but the output terminals do not carry electricity.

The variable-color display lamp LED in the display circuit described above can be a common anode or common cathode variable-color display lamp.

In summary, in the present invention, a well-designed and simple, single-structure display circuit is connected in parallel to the power-input terminals. This improvement to conventional GFCI devices enables the user to clearly identify, by observing color of the variable-color display lamp, whether the power-input terminal connections are correct, and whether or not there may be danger of electric shock.

What is described herein is intended to be merely exemplary and those skilled in the art shall be able to make numerous variations to it without departing from the spirit of the present invention. All such variations and modifications are intended to be within the scope of the present invention as defined in the appended claims.

What is claimed is:

1. A ground fault circuit interrupter device for indicating whether or not power-input terminals are connected correctly, comprising:

a cover plate;

a main body, fitted with at least one power-input terminal, at least one plug-in socket, at least one power-output terminal, a reset button, a simulated earth leakage test button, a current monitoring circuit, and a display circuit with a variable-color display lamp for displaying at least three conditions, wherein said at least one plug-in socket, said reset button, said simulated earth leakage test button, and said variable-color lamp display for displaying at least three conditions being visible even when said cover plate is attached to said main body.

2. The ground fault circuit interrupter device for indicating whether or not power-input terminals are connected correctly according to claim 1, wherein the variable-color display lamp in the said display circuit is a common anode variable-color display lamp.

3. The ground fault circuit interrupter device for indicating whether or not power-input terminals are connected correctly according to claim 1, wherein the variable-color display lamp in the said display circuit is a common cathode variable-color display lamp.

4. The ground fault circuit interrupter device for indicating whether or not power-input terminals are connected correctly according to claim 1, wherein said display circuit includes a current-limiting resistor, a commutation diode, said variable-color display lamp having a two-color display, a common leg, and two control legs, said two control legs of the variable-color display lamp are connected to said at least one power-input terminal and said at least one power-output terminal respectively, and one of said control legs and said common leg of the variable-color display lamp are connected in series to said current-limiting resistor and said commutation diode to form a loop, and in parallel to a side of said at least one power-input terminal.

5. The ground fault circuit interrupter device for indicating whether or not power-input terminals are connected correctly according to claim 1, wherein the variable-color display lamp in capable of displaying three different operating conditions, these operating conditions being, no light when a power source is wrongly connected to the at least one power-output terminal, instead of the at least one power-input terminal, a first color when said power source is properly connected to the at least one power-input terminal, and no power flows to the at least one power-output terminal, and a second color when said power source is properly connected to the at least one power-input terminal, and power flows to the at least one power-output terminal.

\* \* \* \* \*